F. S. ULERY.
MACHINE FOR COMMINUTING CORN.
APPLICATION FILED JUNE 19, 1905.

919,499.

Patented Apr. 27, 1909.
3 SHEETS—SHEET 1.

F. S. ULERY.
MACHINE FOR COMMINUTING CORN.
APPLICATION FILED JUNE 19, 1905.

919,499.

Patented Apr. 27, 1909.
3 SHEETS—SHEET 3.

WITNESSES:
S. N. Pond
Wm. V. Millington

INVENTOR
Frank S. Ulery
BY
Offield, Towle & Linthicum
ATTORNEY

UNITED STATES PATENT OFFICE.

FRANK S. ULERY, OF HOOPESTON, ILLINOIS.

MACHINE FOR COMMINUTING CORN.

No. 919,499.   Specification of Letters Patent.   Patented April 27, 1909.

Application filed June 19, 1905. Serial No. 265,938.

*To all whom it may concern:*

Be it known that I, FRANK S. ULERY, a citizen of the United States, residing at Hoopeston, in the county of Vermilion and State of Illinois, have invented certain new and useful Improvements in Machines for Comminuting Corn, of which the following is a specification.

In preparing corn for use as an article of food, and more especially where the same is put up in cans, it is desirable to more or less comminute the kernels, especially for the purpose of breaking the tough husk or outer envelop of the kernel, inasmuch as this treatment renders the corn more tender and palatable. Several machines for this purpose have heretofore been devised, but a common defect which has hitherto characterized their operation resides in the fact that they crush or mash the kernel, squeezing out the meat of the latter without to any considerable extent breaking, cutting or disintegrating the husk itself.

The primary object sought to be attained by the present invention is the production of a machine capable of so operating upon the corn as to insure the piercing and cutting of the husks; and this object I attain primarily through the employment of cutters having toothed or serrated cutting edges in association with means for forcing the corn directly against and upon said cutters.

In the preferred form of the invention herein illustrated the toothed or serrated cutters are stationary and are disposed substantially radially of a series of pusher arms disposed and operating between adjacent cutters, although it is obvious that this relative arrangement might be reversed.
A machine embodying my present invention in an approved mechanical form is shown in the accompanying drawings, wherein—

Figure 1:
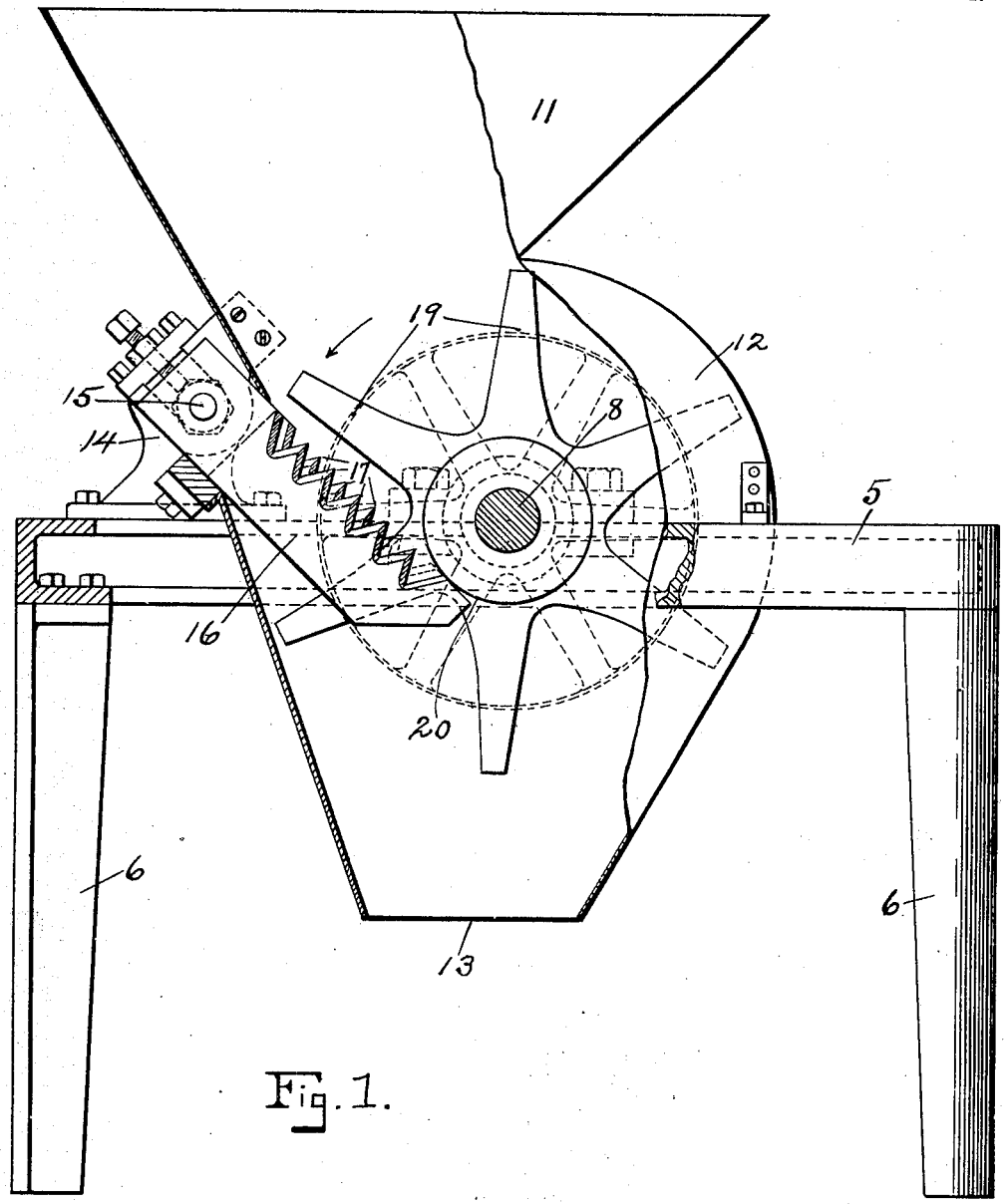
Figure 2:
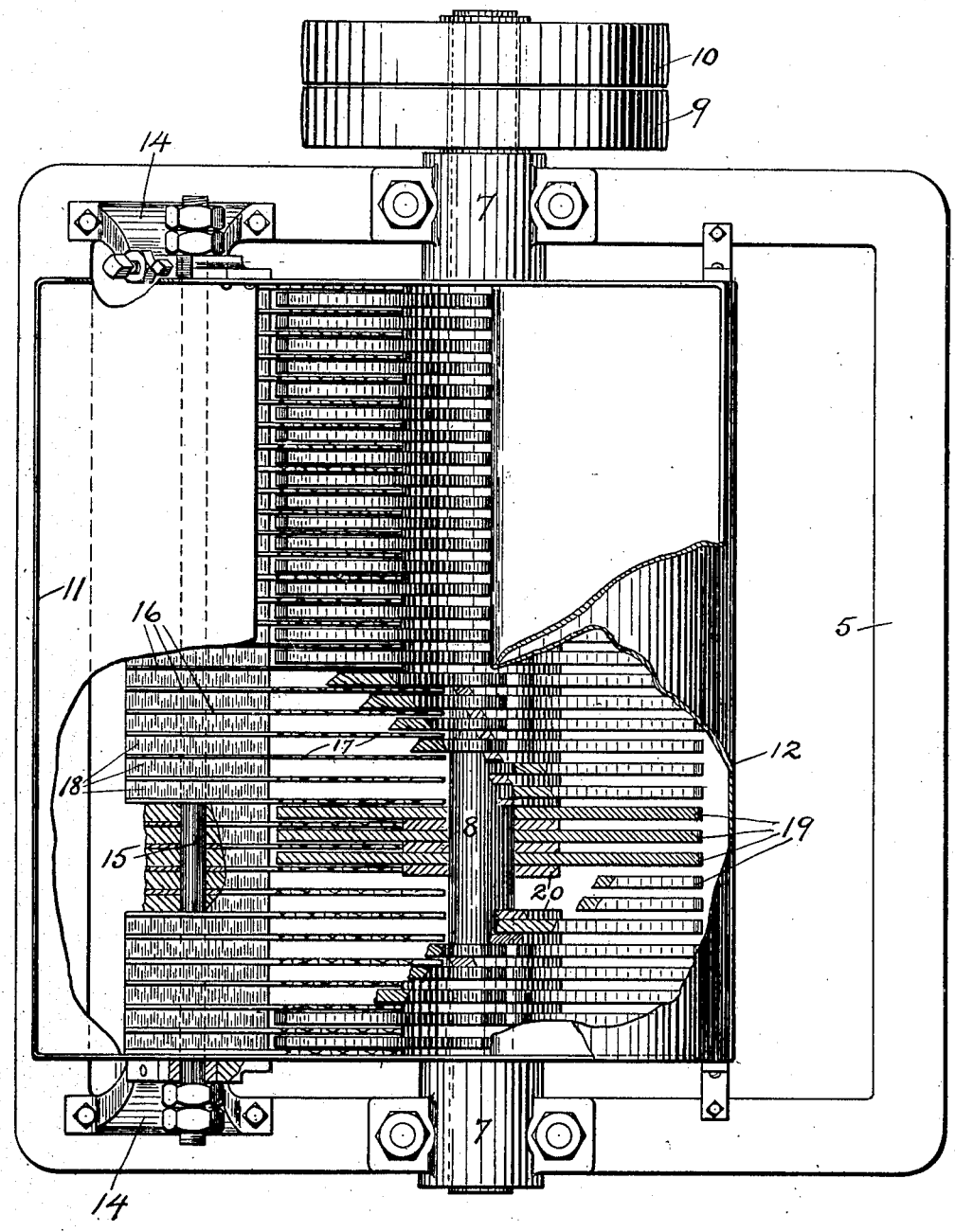
Figure 3:
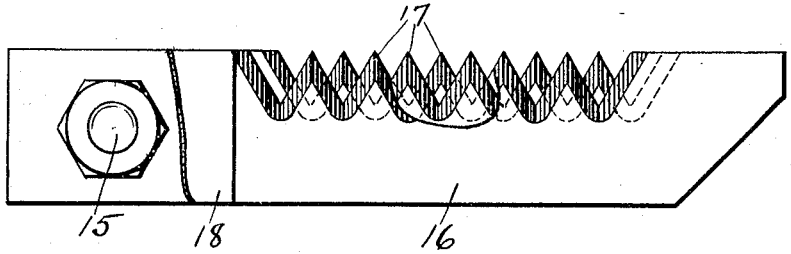
Figure 4:
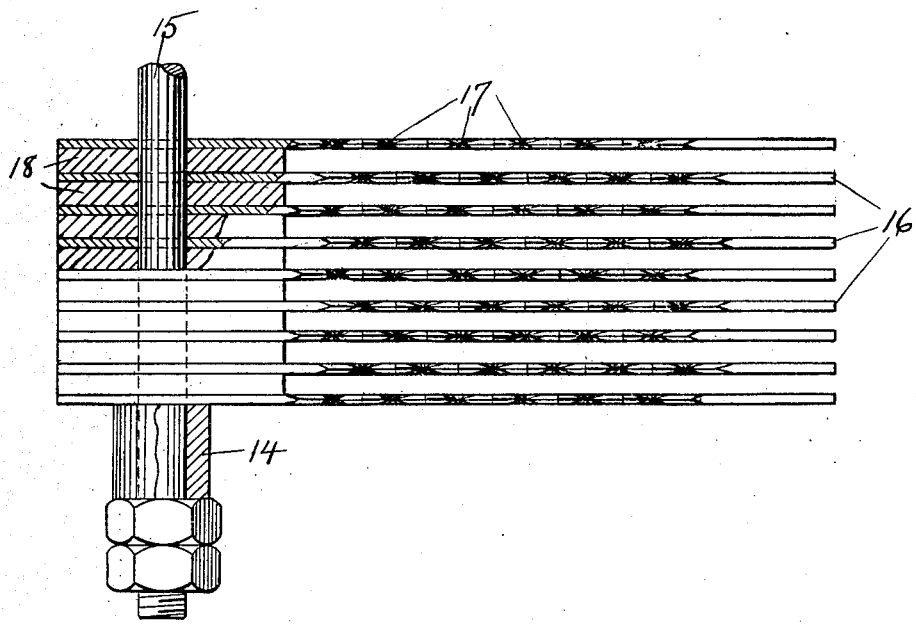

Figure 1 is a side elevational view, partly broken out and in section of the machine;
Fig. 2 is a top plan view of the same partly broken out and in section; Fig. 3 is a side elevational view of a series of cutter blades, illustrating the preferred relative lateral disposition of the teeth thereof; and Fig. 4 is a top plan view, partly in horizontal section, of Fig. 3.

Referring to the drawings, 5 designates a horizontal rectangular frame that is supported at the corners on suitable legs 6.
Mounted in journal bearings 7 on this frame is a shaft 8, provided with the usual fast and loose driving pulleys 9 and 10, respectively. Also mounted on the frame 5 and extending both above and below the same is a suitable sheet metal casing comprising a hopper-shaped upper portion 11, and a substantially cylindrical lower portion 12 having a contracted discharge opening 13 at its lower end. On the end members of the frame 5 are mounted brackets 14, in and between which is secured a shaft 15 parallel with the shaft 8. On this shaft are mounted side by side a series of cutter blades 16, each of which has its upper surface formed with a series of pointed teeth 17. The cutting edges of these teeth are preferably beveled equally on both sides through their entire extent, whereby the points of the teeth are caused to lie in the longitudinal center line of the upper edge of the blade, being equally distant from the vertical planes of the two sides of the blade.

The blades are properly spaced by means of spacing plates 18, mounted on the rod 15 between the shanks of the blades; and the blades are preferably so disposed that the points of one blade lie directly opposite the center of the spaces between the points of adjacent blades on either side. This arrangement effects a more thorough and uniform piercing and cutting of the husks or shells and distributes the material more uniformly over the entire cutting surface of the gang of blades.

On the shaft 8 are mounted a series of pushers, which also, to a certain extent, perform the function of cutters. These devices as herein shown are in the form of star wheels 19; and they are also suitably spaced by means of interposed spacing disks 20, so that the arms of the star wheels will move through the spaces between adjacent stationary blades 16, with very slight clearance. The arms of the star wheels are rectangular in cross-section, as shown, so as to present flat surfaces to the material during the action of forcing the latter upon the cutting blades, which effects a clean cut of the husk or shell without undue mashing, crushing or squeezing of the kernel.

As shown in Fig. 1, the blades 16 are disposed in an inwardly and downwardly inclined direction, the lower ends of the blades at their upper edges practically contacting the peripheries of the spacing disks 20, so that as the arms of the star wheels pass between the blades they form an acute angle therewith tending to move the corn downwardly along the blades.

In the operation of the machie the green corn previously cut from the cob is supplied to the hopper 11, and the shaft 8 is supplied tion in the direction indicated by the arrow in Fig. 1. The successive arms of the star wheels operate to push and crowd the corn down upon the points of the knives; and owing to the peculiar form of the cutting edges of the latter, the kernels are either impaled upon the points of the teeth and thereby split upon being further depressed, or, if they strike the inclined edges of the teeth, they are necessarily crowded into the angle between adjacent teeth and split therein. In any and all positions which the kernels can assume relatively to the knives, they inevitably engage either the sharp points or the sharp cutting edges of the latter, whereby the tough outer husk is completely cut through, thus accomplishing the main object of the invention, which is to insure the comminution of the husks rather than the mere mashing and squeezing of the meat or pulp out of the same. The arms of the star wheels are preferably formed with sharply defined edges whereby more or less of a shearing cut is imparted to the kernels of corn as they are crowded between the knife blades, the pusher arms thus coöperating with the teeth of the latter in effecting the thorough comminution of the corn.

I have described the machine as adapted to facilitate the preparation of corn as an article of food, and contemplate that such will be its principal application, yet it is obvious that the same machine might advantageously be employed in the comminution of other vegetables such as peas and beans.

I claim:

In a machine for the purpose described, the combination with a supporting frame, of a shaft mounted thereon, a series of alternate cutting blades and spacing plates clamped on said shaft, said blades having serrated continuous cutting edges formed on their upper margins, another shaft rotatively mounted on said frame substantially opposite the lower ends of said blades, a series of alternately arranged star-wheels and spacing disks fast on said shaft, the arms of said star-wheels being so formed and disposed as to operate through the spaces between said blades and substantially fill said spaces when passing therethrough, and further having flat advance or operative edges at right angles transversely to the planes of said blades, and a hopper disposed above said star-wheels and cutting blades, substantially as described.

FRANK S. ULERY.

Witnesses:
E. O. GRIFFITH,
J. S. McFENEN.